US008837336B2

United States Patent

Tikka et al.

(10) Patent No.: US 8,837,336 B2
(45) Date of Patent: Sep. 16, 2014

(54) ANTENNA ARRANGEMENT

(75) Inventors: Pasi Tikka, Munich (DE); Pasi Lehtonen, Rusko (FI); Kurt Wiesbauer, Deutschlandsberg (AT)

(73) Assignee: Epcos AG, Munich (DE)

( * ) Notice: Subject to any disclaimer, the term of this patent is extended or adjusted under 35 U.S.C. 154(b) by 455 days.

(21) Appl. No.: 13/273,846

(22) Filed: Oct. 14, 2011

(65) Prior Publication Data

US 2012/0093046 A1 Apr. 19, 2012

(30) Foreign Application Priority Data

Oct. 15, 2010 (DE) ........................ 10 2010 048 619

(51) Int. Cl.
*H04L 5/00* (2006.01)
*H04W 4/00* (2009.01)
*H01Q 1/52* (2006.01)

(52) U.S. Cl.
CPC .................................... *H01Q 1/521* (2013.01)
USPC .......................................... 370/297; 370/334

(58) Field of Classification Search
CPC ...................................................... H01Q 1/521
USPC .......................................................... 370/297
See application file for complete search history.

(56) References Cited

U.S. PATENT DOCUMENTS 6,128,474 A * 10/2000 Kim et al. .................. 455/67.11
6,332,071 B1 * 12/2001 Brandt ............................ 455/82
6,804,207 B2 * 10/2004 Bolgiano et al. .............. 370/320
7,986,647 B2 * 7/2011 Ghadaksaz ................... 370/293
2003/0054775 A1 * 3/2003 Eaves et al. ...................... 455/80
2006/0194550 A1 * 8/2006 Block et al. ...................... 455/78
2009/0086655 A1 * 4/2009 Ghadaksaz ................... 370/293
2009/0219213 A1 * 9/2009 Lee et al. ............... 343/700 MS
2011/0053646 A1 * 3/2011 Kundmann et al. ........ 455/562.1
2011/0116423 A1 * 5/2011 Rousu et al. .................. 370/297

FOREIGN PATENT DOCUMENTS

DE 198 53 484 A1 5/1999
DE 10 2009 004 720 A1 7/2010
WO WO 2010/052150 A1 5/2010
WO WO 2010/081635 A1 7/2010

* cited by examiner

*Primary Examiner* — Gerald Smarth
(74) *Attorney, Agent, or Firm* — Slater & Matsil, L.L.P.

(57) ABSTRACT

An antenna arrangement has a first signal path connected to a first antenna. A second signal path is connected to a second antenna. A third signal path includes a device that measures the signal strength. Directional couplers couple the first and second signal paths to the third signal path. Filters filter out signal components that are coupled by one antenna into the other antenna.

8 Claims, 4 Drawing Sheets

Prior Art

ANTENNA ARRANGEMENT

This application claims priority to German Patent Application 10 2010 048 619.1, which was filed Oct. 15, 2010 and is incorporated herein by reference.

TECHNICAL FIELD

The present invention relates to an antenna arrangement in which a first and a second signal path are each coupled by means of a directional coupler to a third signal path. The first and second signal paths are each connected to a first and a second antenna, respectively.

BACKGROUND

Appliances for mobile communication should support sending and receiving in different frequency bands. Since an antenna can usually have an optimum radiation characteristic only for one frequency band at the resonant frequency of the antenna, however, communication appliances having a plurality of, but at least two, antennas are customary. In the case of appliances having a plurality of antennas, interactions between the individual antennas are often unavoidable, however. When a first antenna is active, for example, the radiation emitted by the first antenna is coupled into the second antenna again. Such coupling of the two antennas is often undesirable.

In addition, antenna arrangements are known in which a first signal path, which is connected to a first antenna, and a second signal path, which is connected to a second antenna, are coupled by means of directional couplers to a third signal path each. FIG. 1 shows such an antenna arrangement, which is known in the prior art.

The first antenna Ant1 is used for sending and receiving signals from a high-frequency band. The second antenna Ant2 is designed for frequencies from a low-frequency band. In this case, the low-frequency band is defined in that it comprises frequencies which are lower than the frequencies of the high-frequency band. It is possible for the frequency range of the low-frequency band to adjoin the frequency range of the high-frequency band.

The antenna arrangement shown in FIG. 1 has a first signal path SP1, a second signal path SP2 and a third signal path SP3. The first signal path SP1 has a switch S1 which can be used to connect the first signal path SP1 to further signal paths SPHF1, SPHF2, SPHF3 which are connected to a transmission and reception circuit for frequencies from the high-frequency band and which have various filters for high-frequency signals. In addition, the first signal path SP1 can be connected by means of this switch S1 to a terminating resistor R1. The first signal path SP1 is also coupled by means of a dual-band directional coupler DRK to the third signal path SP3. The first signal path SP1 is connected to the first antenna Ant1.

A second signal path SP2 has a second switch S2 which can be used to connect the second signal path SP2 to further signal paths SPLF1, SPLF2, SPLF3 which are connected to a transmission and reception circuit for frequencies from the low-frequency band and which have various filters for frequency ranges from the low-frequency band. Furthermore, the second signal path SP2 can be connected by means of this second switch S2 to a terminating resistor R2. The dual-band directional coupler DRK couples the second signal path SP2 to the third signal path SP3. The second signal path SP2 is connected to the second antenna Ant2.

In the positions of the first switch S1 and the second switch S2 which are shown in FIG. 1, the first antenna Ant1 is connected by means of the first switch S1 to the terminating resistor R1 and the second antenna Ant2 is connected by means of the second switch S2 to the further signal path SPLF1, which is connected to a transmission and reception circuit for a particular frequency range from the low-frequency band. Accordingly, the first antenna Ant1 is terminated and the second antenna Ant2 is active.

The third signal path SP3 is coupled by means of the dual-band directional coupler DRK to the first and second signal paths SP1, SP2. The third signal path SP3 also has measuring devices ME_forward and ME_reflected. In the switch position of the switches S1, S2 which are shown in FIG. 1, a signal from the transmission device for low frequencies is coupled into the second signal path SP2 via the signal path SPLF1 and the second switch S2. A certain signal component is coupled from the second signal path SP2 into the third signal path SP3 by means of the dual-band directional coupler DRK. This signal component reaches the measuring device ME_forward. This measurement can be used to determine a gain factor for the antenna arrangement and the transmission device.

In the second signal path SP2, the signal component which has not been deflected into the third signal path SP3 by means of the dual-band directional coupler DRK now reaches the second antenna Ant2 and is emitted thereby. However, a certain signal component is also reflected by the second antenna Ant2. The reflected signal component now takes the second signal path SP2 in the reverse direction and is to some extent coupled into the third signal path SP3 by the dual-band directional coupler DRK. In the third signal path SP3, this signal component reaches the measuring device ME_reflected. In this way, a possible mismatch in the second antenna Ant2 can be determined.

In a converse switch position for the switches S1, S2, the second signal path SP2 is connected to the terminating resistor R2 and the first signal path SP1 is connected to one of the further signal paths SPHF1, SPHF2 or SPHF3. Accordingly, the first antenna Ant1 is then active and the second antenna Ant2 is terminated.

Again, the dual-band directional coupler DRK prompts part of the inbound signal to be coupled out of the first signal path SP1, to be coupled into the third signal path SP3 and thus to reach the measuring device ME_forward, which ascertains the gain factor for the antenna arrangement. In addition, a signal component reflected by the first antenna Ant1 is to some extent coupled by means of the dual-band directional coupler DRK into the third signal path SP3, where it reaches the measuring device ME_reflected, which determines the mismatch in the first antenna.

The third signal path SP3 also has damping elements DE1, DE2, DE3, DE4, DE5, DE6. These ensure that only a small signal component is coupled into the third signal path SP3 from the second or first signal path SP1, SP2. Customary attenuation in this case is in the region of 20 dB.

In the antenna arrangement shown in FIG. 1, it is crucial that the first and second antennas Ant1, Ant2 are very well insulated from one another. If the active antenna, in this case the second antenna Ant2, were to couple signals into the passive, terminated antenna, in this case the first antenna Ant1, then these signals would likewise enter the third signal path SP3 via the dual-band directional coupler DRK and corrupt the measurements by the measuring devices ME_forward, ME_reflected in the third signal path.

SUMMARY OF THE INVENTION

In one aspect, the present invention provides an antenna arrangement that ensures the same quality of signal isolation when there is little insulation between two antennas.

An embodiment of the invention proposes an antenna arrangement which has a first signal path, which is connected to a first antenna, a second signal path, which is connected to a second antenna, a third signal path, which has means for measuring the signal strength, and directional couplers which couple the first signal path and the second signal path each to the third signal path. In addition, the antenna arrangement according to the invention has filters which filter out signal components which are coupled by one antenna into the other antenna.

The first antenna may be designed for a high-frequency band and the second antenna may be designed for a low-frequency band. In this case, the low-frequency band is defined in that it contains frequencies which are lower than the frequencies in the high-frequency band. The low-frequency band can directly adjoin the high-frequency band.

The first and second signal paths preferably contain switches which can be used to connect the first or the second signal path each to different transmission and reception circuits for different frequency ranges.

The first and second signal paths can each be connected to the third signal path by means of a common dual-band directional coupler.

In a first refinement of the present invention, the first and second signal paths each contain a diplexer. In the first signal path, the diplexer is connected to the first antenna, and, similarly, in the second signal path, the diplexer is connected to the second antenna. One output of each of the two diplexers is in this case connected to a respective terminating resistor. The other output of each of the two diplexers is connected to the dual-band directional coupler. The diplexers have a high-pass filter and a low-pass filter. In addition, the diplexers are connected up such that, in the first signal path, the low-pass filter of the first diplexer is connected to the terminating resistor and the high-pass filter of this diplexer is connected to the dual-band directional coupler. Conversely, in the second signal path, the high-pass filter of the second diplexer is connected to the terminating resistor and the low-pass filter is connected to the dual-band directional coupler. In this case, the first signal path is connected to the high-frequency antenna and the second signal path is connected to the low-frequency band antenna.

The interconnection of the diplexers that is described here allows signals which are coupled by one antenna via the other antenna into the respective other signal path to be filtered out again. In the high-frequency signal path, a wave reflected from the high-frequency antenna is forwarded by the low-pass filter to the terminating resistor. The latter acts as a sump. An inbound wave containing frequencies from the high band passes through the high-pass filter and is not damped in this case.

Conversely, signals can be coupled by the high-frequency antenna into the low-frequency antenna, and these signals are forwarded via the high-pass filter of the diplexer to the terminating resistor. This exemplary embodiment furthermore affords the advantage that the switches do not need to set up a connection to a terminating resistor.

In accordance with a second exemplary embodiment of the present invention, two diplexers are arranged in the third signal path on the input and output sides. In this regard, the third signal path is split into two sub-signal paths, wherein the first sub-signal path is connected by means of a first directional coupler to the first signal path and the second sub-signal path is connected by means of a second directional coupler to a second signal path. The third signal path has two diplexers which each connect the two sub-signal paths to form a main signal path and connect them to the measuring devices.

In an antenna arrangement based on the second exemplary embodiment, a high level of insulation between the two antennas is not necessary since the diplexers can be connected up such that undesirable signals coupled by one antenna into the other antenna can be filtered out again. Since, in accordance with the second exemplary embodiment, the diplexers are now arranged in the third signal path and they are therefore no longer arranged in the first or second signal path, they do not have a damping effect on a wave entering an antenna.

In accordance with a third exemplary embodiment, the third signal path contains a high-pass filter and the second signal path contains a low-pass filter.

BRIEF DESCRIPTION OF THE DRAWINGS

The invention is explained in more detail below with reference to exemplary embodiments and the associated figures. The figures use schematic illustrations, which are not to scale, to show various exemplary embodiments of the invention.

The following list of reference symbols may be used in conjunction with the drawings:

| | |
|---|---|
| Ant1 | First antenna |
| Ant2 | Second antenna |
| SP1 | First signal path |
| SP2 | Second signal path |
| SP3 | Third signal path |
| S1 | First switch |
| S2 | Second switch |
| SPHF1 | Further signal path |
| SPHF2 | Further signal path |
| SPHF3 | Further signal path |
| SPLF1 | Further signal path |
| SPLF2 | Further signal path |
| SPLF3 | Further signal path |
| R1 | First terminating resistor |
| R2 | Second terminating resistor |
| DRK | Dual-band directional coupler |
| ME_forward | Measuring device |
| ME_reflected | Measuring device |
| DE1-DE6 | Damping element |
| DP1 | First diplexer |
| DP2 | Second diplexer |
| SP3a | First sub-signal path |
| SP3b | Second sub-signal path |
| RK1 | First directional coupler |
| RK2 | Second directional coupler |

DETAILED DESCRIPTION OF ILLUSTRATIVE EMBODIMENTS

Figure 1:
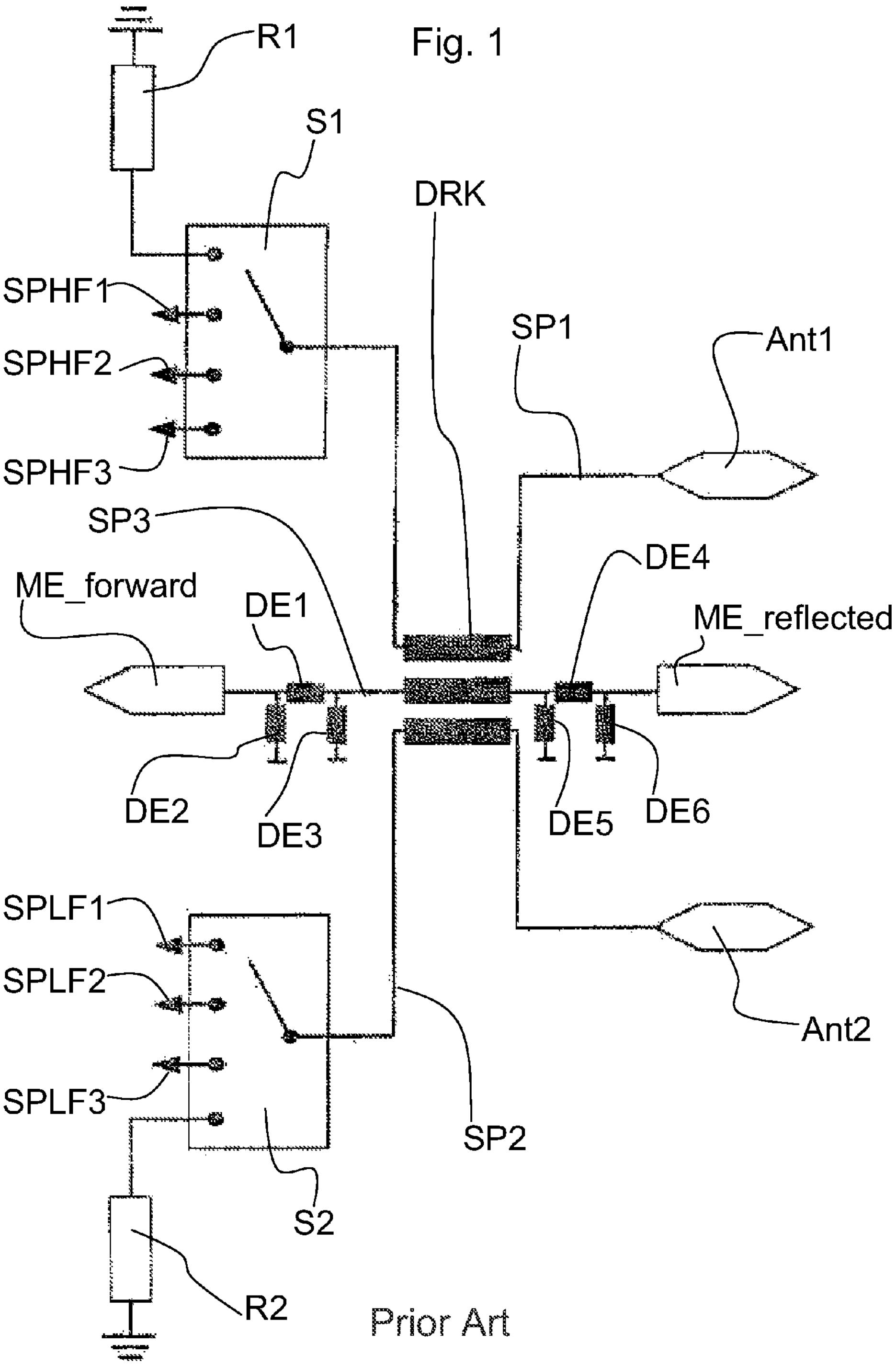
FIG. 1 shows an antenna arrangement as is known in the prior art.
Figure 2:
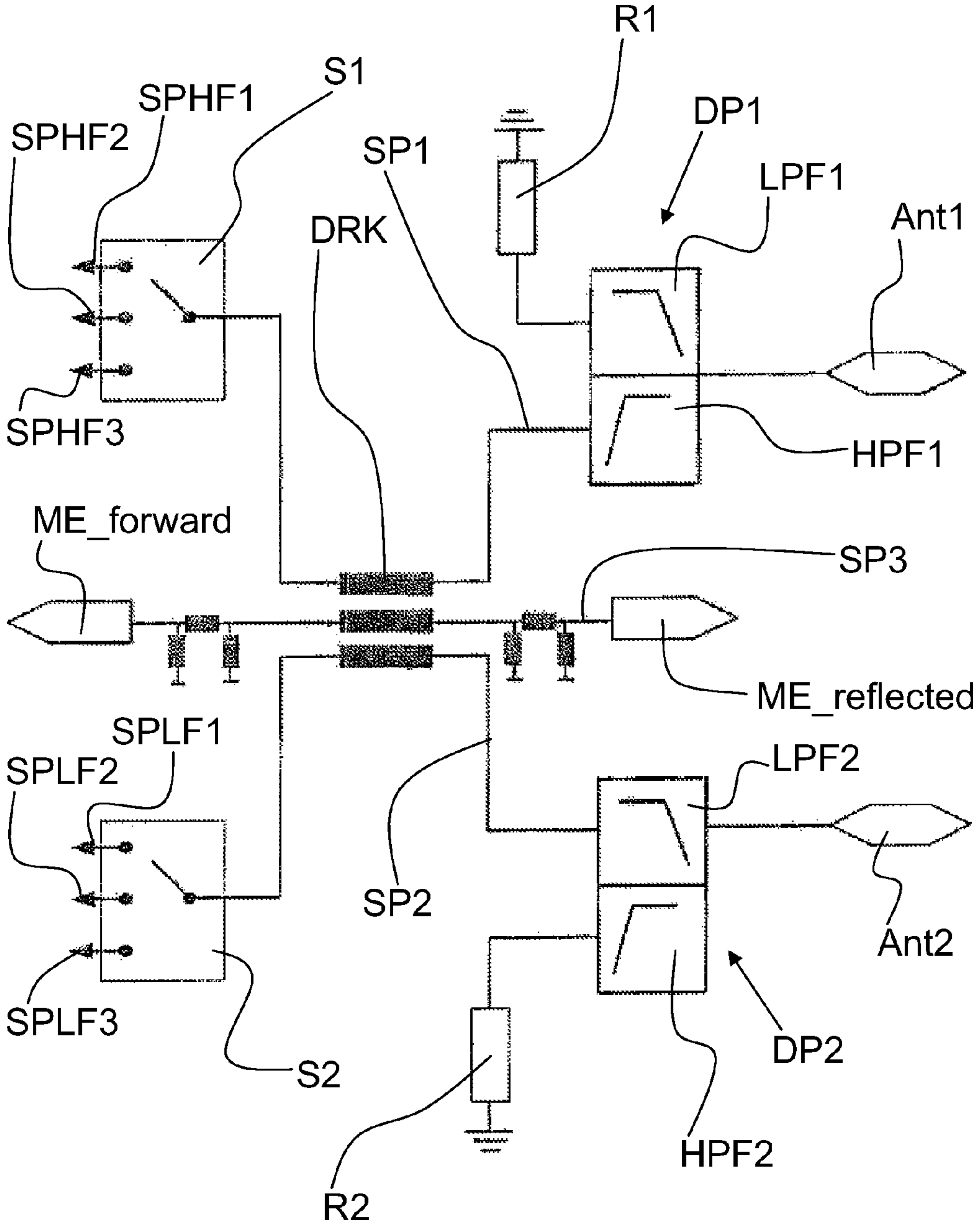
FIG. 2 shows a first exemplary embodiment of an antenna arrangement according to the invention.

The antenna arrangement shown in FIG. 2 is distinguished from the antenna arrangement shown in FIG. 1, which is known in the prior art, by virtue of the first and second signal paths SP1, SP2 each containing a diplexer DP1, DP2. Each of these two diplexers DP1, DP2 has a high-pass filter HPF1, HPF2 and a low-pass filter LPF1, LPF2.

The first signal path SP1 is connected to a first antenna Ant1 for frequencies from a high-frequency band. The second signal path SP2 is connected to a second antenna Ant2 for frequencies from a low-frequency band. The diplexer DP1 in the first signal path SP1 is connected up such that a high-pass filter HPF1 is connected to the dual-band directional coupler DRK and the first antenna Ant1. A low-pass filter LPF1 is connected to a terminating resistor R1 and the first antenna Ant1.

If a signal is now coupled into the first signal path SP1 via the first switch S1 and the transmission device, this signal is not attenuated in the high-pass filter, since the signal comes from the frequency range of the high band. An inbound wave accordingly reaches the first antenna Ant1 undamped. If, by contrast, the second antenna Ant2 couples a signal at a frequency from the low-frequency band into the first antenna Ant1, this returning wave is severely damped by the high-frequency filter. Accordingly, such a returning wave does not enter the dual-band directional coupler DRK. The undesirable, coupled-in wave is forwarded via the low-pass filter LPF1 to the terminating resistor R1. The latter acts as a wave sump.

The second signal path SP2 is set up in a similar manner. In this case too, the diplexer DP2 has a high-pass filter HPF2 and a low-pass filter LPF2. The high-pass filter HPF2 is connected to the second antenna Ant2 and to the second terminating resistor R2. The low-pass filter LPF2 is connected to the second antenna Ant2 and to the dual-band directional coupler DRK. An inbound wave which is coupled into the second signal path SP2 by the transmission device for low frequencies is not damped by the low-pass filter LPF2 of the second diplexer DP2 and accordingly reaches the second antenna Ant2 undamped. If, by contrast, a signal emitted by the high-frequency band antenna Ant1 is coupled into the second antenna Ant2, this returning wave is severely damped by the high-pass filter HPF2 of the second diplexer DP2 and does not reach the third signal path SP3. On the contrary, such an outbound wave is forwarded via the high-pass filter HPF2 of the second diplexer DP2 to the second terminating resistor R2, which acts as a wave sump.

Figure 3:
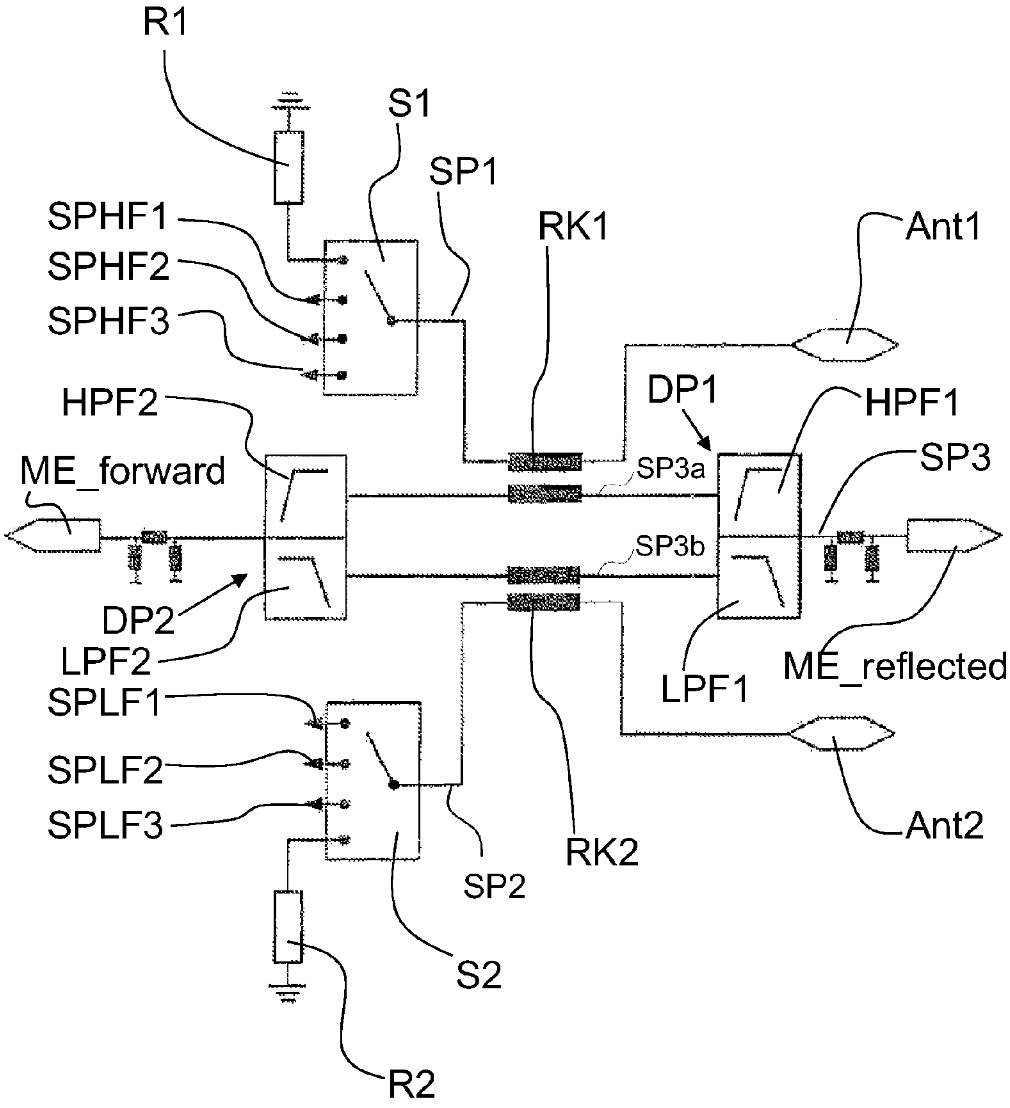
FIG. 3 shows a second exemplary embodiment of an antenna arrangement according to the invention.

FIG. 3 shows a second exemplary embodiment of the present invention. This differs from the antenna arrangement which is known in the prior art, and which is shown in FIG. 1, by virtue of the third signal path SP3 being split into two sub-signal paths SP3*a* and SP3*b*. The first and second signal paths SP1, SP2 are each coupled to one of the sub-signal paths SP3*a*, SP3*b* by means of a directional coupler RK1, RK2.

The third signal path SP3 also has two diplexers DP1, DP2. The diplexers DP1, DP2 are connected up such that they are each connected to one end of one of the sub-signal paths SP3*a*, SP3*b* and connect up the two sub-signal paths SP3*a*, SP3*b* to form a common signal path SP3. The diplexers DP1, DP2 each have a high-pass filter HPF1, HPF2 and a low-pass filter LPF1, LPF2.

Again, the high-pass and low-pass filters HPF1, HPF2, LPF1, LPF2 are connected up such that a wave, the frequency of which corresponds to the resonant frequency of the antenna associated with the relevant signal path, reaches the measuring devices ME_forward, ME_reflected undamped, while a wave which has been coupled into the signal path by the other antenna is severely damped by the relevant filters.

The first signal path SP1 also has a first switch S1, which can be used to connect the first signal path SP1 to various further signal paths SPHF1, SPHF2, SPHF3 which are in turn connected to a transmission and reception device for signals with a frequency range from the high-frequency band. The second signal path SP2 also has a second switch S2, which can be used to connect the second signal path SP2 to various further signal paths SPLF1, SPLF2, SPLF3 which in turn are connected to a transmission and reception device for signals with a frequency range from the low-frequency band.

The switch position of the switches S1 and S2 which is shown in FIG. 3 will now be considered in more detail. The second switch S2 connects the second signal path SP2 to the further signal path SPLF1, which has a signal with a frequency range from the low-frequency band applied to it. The first switch S1 connects the first signal path SP1 to the first terminating resistor R1, so that the first antenna Ant1 has no signal applied to it.

The signal which is coupled into the second signal path SP2 via the second switch S2 first of all reaches the directional coupler RK2. A certain signal component is coupled by this directional coupler RK2 into the second sub-signal path SP3*b* of the third signal path SP3. There, the signal arrives at the low-pass filter LPF2 of the second diplexer DP2. The signal is not attenuated by this low-pass filter LPF2 and enters the third signal path SP3, which is connected to the measuring device ME_forward. This measuring device ME_forward ascertains the signal strength and determines a gain factor therefrom.

The signal component which has not been coupled out of the second signal path SP2 by the directional coupler RK2 reaches the second antenna Ant2 and is emitted thereby. However, a certain signal component is reflected back into the second signal path SP2, possibly on account of a mismatch in the second antenna Ant2. Part of this returning wave is now coupled out by the directional coupler RK2 and coupled into the second sub-signal path SP3*b* of the third signal path SP3. Via the low-pass filter LPF1 the first diplexer DP1, this signal component enters the third signal path SP3, which is connected to the measuring device ME_reflected. This measuring device ME_reflected in turn determines the signal strength and ascertains the mismatch in the second antenna Ant 2 therefrom.

A certain signal component of the signal emitted by the second antenna Ant2 is coupled into the first antenna Ant1. The level of this signal component is dependent on the insulation between the two antennas Ant1, Ant2. The antenna arrangements known in the prior art always demand an extremely high level of insulation. The signal component which is coupled into the first antenna Ant1 enters the first signal path. In this case, a large signal component is forwarded via the first switch S1 to the terminating resistor R1, which acts as a wave sump. However, a small signal component is also coupled by means of the directional coupler RK1 into the first sub-signal path SP3*a* of the third signal path SP3.

Even if the signal strength of this signal component is very low, this signal component would result in a not negligible corruption of the measurements by the measuring devices ME_forward and ME_reflected. However, the signal component in the sub-signal path SP3*a* arrives at the high-pass filter HPF1 of the first diplexer DP1 and is filtered out there, so that the measuring devices ME_forward, ME_reflected are not influenced.

Accordingly, the two diplexers DP1, DP2 ensure that undesirable signals which are coupled by one antenna into the signal path which is connected to the other antenna are again filtered out and thus cannot corrupt the measurements by the measuring devices ME_forward or ME_reflected. Therefore, for an antenna arrangement as shown in FIG. 3, the requirements in terms of the insulation between the two antennas Ant1, Ant2 are significantly lower.

The antenna arrangement shown in FIG. 3 affords the advantage over the first exemplary embodiment that the diplexers DP1, DP2 are now arranged in the third signal path SP3 and that accordingly the signal in the first or in the second signal path SP1, SP2 is not attenuated.

Figure 4:
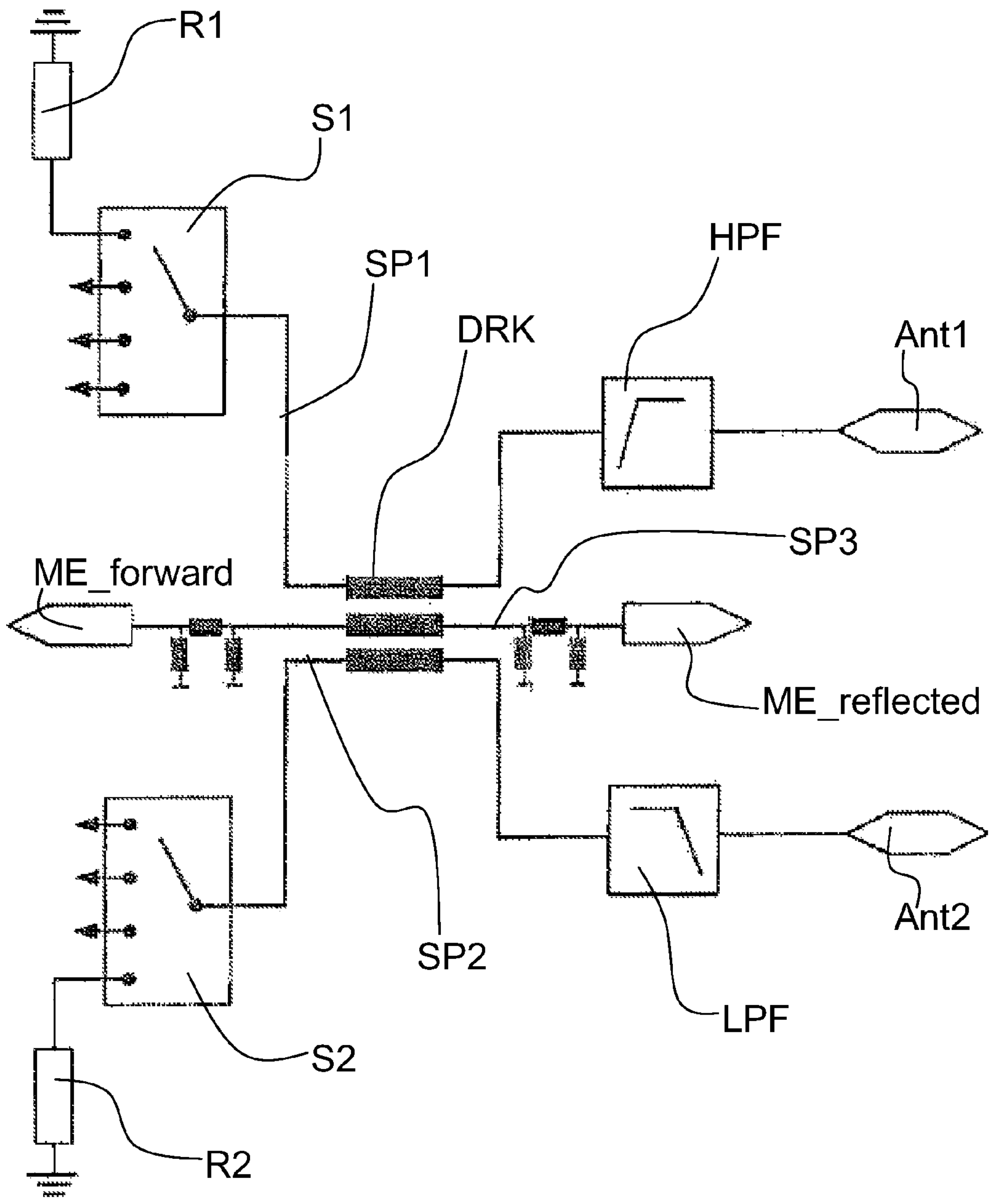
FIG. 4 shows a third exemplary embodiment of an antenna arrangement according to the invention.

FIG. 4 shows a third exemplary embodiment of the present invention. This antenna arrangement differs from an antenna arrangement as shown in FIG. 1 in that the first signal path SP1 contains a high-pass filter HPF and the second signal path SP2 contains a low-pass filter LPF.

The way in which this antenna arrangement works essentially corresponds to that of the first exemplary embodiment shown in FIG. 2. Only the diplexer DP1 in the first signal path SP1 has been replaced by a high-pass filter HPF, and the diplexer DP2 in the second signal path SP2 has been replaced by a low-pass filter LPF. In addition, the first switch S1 in this case can connect the first signal path to a terminating resistor R1, and the second switch S2 can connect the second signal path SP2 to a second terminating resistor R2.

The high-pass filter HPF in the first signal path SP1 prompts signals which are coupled into the first signal path SP1 by the second antenna Ant2 to be attenuated and not to corrupt a measurement by the measuring devices ME_forward and ME_reflected. The low-pass filter LPF in the second signal path SP2 filters out undesirable signals which are emitted by the first antenna Ant1 and are coupled into the second antenna Ant2 and hence into the second signal path SP2.

Accordingly, the high-pass filter HPF and the low-pass filter LPF ensure that respective undesirable signals which are coupled by one antenna into the signal path connected to the other antenna are filtered out without disturbing the measurements by the measuring devices ME_forward, ME_reflected in the third signal path SP3. For this reason, an antenna arrangement as shown in FIG. 4 places much lower demands on the insulation between the two antennas Ant1 and Ant2, given the same quality of signal isolation, than would be case with an antenna arrangement as shown in FIG. 1.

What is claimed is:

1. An antenna arrangement, comprising:
- a first signal path connected to a first antenna;
- a second signal path connected to a second antenna;
- a third signal path that includes a measurement device configured to measure signal strength;
- a first directional coupler that couples the first signal path to the third signal path;
- a second directional coupler that couples the second signal path to the third signal path; and
- a plurality of filters that filter out signal components that are coupled by the antenna into the second antenna and by the second antenna into the first antenna;
- wherein the third signal path is split into first and second sub-signal paths;
- wherein the first sub-signal path is connected to the first signal path by the first directional coupler and the second sub-signal path is connected to the second signal path by the second directional coupler;
- wherein the third signal path has two diplexers that are arranged at input-side and output-side ends of the two sub-signal paths and connect the input and output sides of the two sub-signal paths to a respective common signal path; and
- wherein the two diplexers are connected to the measurement device.

2. The antenna arrangement according to claim 1, wherein the first antenna is designed for frequencies from a high-frequency band and wherein the second antenna is designed for frequencies from a low-frequency band, wherein the low-frequency band comprises lower frequencies than the high-frequency band and adjoins the high-frequency band.

3. The antenna arrangement according to claim 2,
- wherein the first signal path includes a first switch between different connections that can be used to connect the first signal path to a transmission and reception circuit for frequencies from the high-frequency band, and
- wherein the second signal path includes a second switch between different connections that can be used to connect the second signal path to a transmission and reception circuit for frequencies from the low-frequency band.

4. The antenna arrangement according to claim 1, wherein the two diplexers each have a high-pass filter and a low-pass filter.

5. The antenna arrangement according to claim 4, wherein the first sub-signal path is connected to the high-pass filter of each of the two diplexers, and
- wherein the second sub-signal path is connected to the low-pass filter of each of the two diplexers.

6. An antenna arrangement, comprising:
- a first signal path connected to a first antenna;
- a second signal path connected to a second antenna;
- a third signal path that includes a measurement device configured to measure signal strength;
- a first directional coupler that couples the first signal path to the third signal path;
- a second directional coupler that couples the second signal path to the third signal path; and
- a plurality of filters that filter out signal components that are coupled by the antenna into the second antenna and by the second antenna into the first antenna;
- wherein the third signal path is split into first and second sub-signal paths;
- wherein the first sub-signal path is connected to the first signal path by the first directional coupler and the second sub-signal path is connected to the second signal path by the second directional coupler;
- wherein the third signal path has two diplexers that are arranged at input-side and output-side ends of the two sub-signal paths and connect the input and output sides of the two sub-signal paths to a respective common signal path;
- wherein the two diplexers each have a high-pass filter and a low-pass filter;
- wherein the first sub-signal path is connected to the high-pass filter of each of the two diplexers; and
- wherein the second sub-signal path is connected to the low-pass filter of each of the two diplexers.

7. The antenna arrangement according to claim 6, wherein the first antenna is designed for frequencies from a high-frequency band and wherein the second antenna is designed for frequencies from a low-frequency band, wherein the low-frequency band comprises lower frequencies than the high-frequency band and adjoins the high-frequency band.

8. The antenna arrangement according to claim 7,
- wherein the first signal path includes a first switch between different connections that can be used to connect the first signal path to a transmission and reception circuit for frequencies from the high-frequency band, and
- wherein the second signal path includes a second switch between different connections that can be used to connect the second signal path to a transmission and reception circuit for frequencies from the low-frequency band.

* * * * *